United States Patent
Tanaka et al.

(10) Patent No.: US 6,882,080 B2
(45) Date of Patent: Apr. 19, 2005

(54) PERMANENT MAGNET SYNCHRONOUS MOTOR

(75) Inventors: Toshinori Tanaka, Tokyo (JP); Yuusuke Matsui, Tokyo (JP); Keiichi Fukazawa, Tokyo (JP); Satoru Akutsu, Tokyo (JP); Kengo Fujimoto, Tokyo (JP); Katsumi Ohata, Tokyo (JP); Takeshi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,656

(22) Filed: Aug. 28, 2003

(65) Prior Publication Data

US 2004/0119363 A1 Jun. 24, 2004

(30) Foreign Application Priority Data

Aug. 29, 2002 (JP) ...................................... 2002-250454

(51) Int. Cl.$^7$ ................................................ H02K 1/00
(52) U.S. Cl. ...................................... 310/216; 310/254
(58) Field of Search ............................... 310/216–218, 310/254, 258, 259

(56) References Cited

U.S. PATENT DOCUMENTS

| | | | | |
|---|---|---|---|---|
| 5,091,667 A | * | 2/1992 | Tomite | 310/154.26 |
| 5,250,867 A | * | 10/1993 | Gizaw | 310/179 |
| 5,260,620 A | * | 11/1993 | Morrill | 310/185 |
| 5,642,013 A | * | 6/1997 | Wavre | 310/254 |
| 5,757,100 A | * | 5/1998 | Burgbacher | 310/186 |
| 5,990,592 A | * | 11/1999 | Miura et al. | 310/156.53 |
| 6,356,001 B1 | * | 3/2002 | Nishiyama et al. | 310/156.53 |
| 6,703,753 B1 | * | 3/2004 | Fujinaka | 310/216 |
| 2001/0048264 A1 | | 12/2001 | Trago et al. | 310/254 |

FOREIGN PATENT DOCUMENTS

| | | |
|---|---|---|
| EP | 0543625 A2 | 5/1993 |
| EP | 0841738 A1 | 5/1998 |
| EP | 1217713 A2 | 6/2002 |
| JP | 11-089197 | 3/1999 |
| JP | 11-146584 | 5/1999 |
| JP | 3076006 | 6/2000 |
| JP | 2002-101628 | 4/2002 |
| WO | WO 0048289 A1 | 8/2000 |

* cited by examiner

*Primary Examiner*—Dang Le
(74) *Attorney, Agent, or Firm*—Sughrue Mion, PLLC

(57) ABSTRACT

A stator core is formed into a cylindrical shape, 3n teeth are disposed at a predetermined pitch in a circumferential direction where n is a positive integer, and slots are formed between adjacent pairs of the teeth so as to open onto an inner circumferential side. A stator coil is installed as a concentrated winding in the stator core. A rotor is rotatably disposed inside the stator and 2n permanent magnets are disposed at a predetermined pitch in a circumferential direction on an outer peripheral portion of a shaft. The stator core is constructed such that a slot opening (d) and a slot pitch (p) at an inner circumferential surface of the stator core satisfy an expression $0.1 \leq d/p \leq 0.3$.

4 Claims, 5 Drawing Sheets

PERMANENT MAGNET SYNCHRONOUS MOTOR

BACKGROUND OF THE INVENTION

1. Field of the Invention

The present invention relates to a permanent-magnet synchronous motor in which permanent field magnets are provided in a rotor.

2. Description of the Related Art

Generally, concentrated-winding permanent-magnet synchronous motors are constructed such that 3n teeth of a stator core are disposed at a uniform pitch where n is a positive integer, a stator coil is formed by Y-connecting three phases of coil each wound independently onto the teeth, and 2n permanent magnets are disposed so as to face the stator core. In other words, concentrated-winding permanent-magnet synchronous motors have a 2n-pole permanent magnetic field disposed relative to 3n teeth.

Because a concentrated winding method is adopted in conventional permanent-magnet synchronous motors constructed in this manner, inductance is increased by adjacent teeth forming opposite poles, facilitating the action of demagnetizing fields on the permanent magnets. Thus, with the magnetic poles generated by the stator coil and the magnetic poles of the permanent magnets opposing each other, one problem has been that portions of the magnetic fields generated by the stator coil enter the permanent magnets and act on the permanent magnets as demagnetizing fields, demagnetizing the permanent magnets.

In order to overcome problems of this kind, a permanent-magnet synchronous motors has been proposed as an improvement in Japanese Patent No. 3076006, for example, in which a space between the teeth is reduced to allow magnetic fields generated by the stator coil to flow to adjacent teeth instead of entering the permanent magnets.

In this conventional permanent-magnet synchronous motor proposed as an improvement in Japanese Patent No. 3076006, a space (La) between an adjacent pair of tooth tip portions and an air gap (Lg) between a stator core and a rotor, are constructed so as to satisfy an expression $0.3 \, Lg < La \leq 2.0 \, Lg$. Furthermore, the space between the teeth (La) is set between 0.3 mm and 0.4 mm.

Because the space (La) between the adjacent pair of tooth tip portions is equal to or less than 2.0 times the air gap (Lg), the flow of demagnetizing magnetic flux to the rotor (the permanent magnets) can be suppressed. As a result, it is claimed that even if the magnetic poles generated by the stator coil and the magnetic poles of the permanent magnets oppose each other, demagnetizing fields are less likely to act on the permanent magnets, enabling improvement in the strength of the permanent magnets against demagnetization.

Because the space between the adjacent pair of tooth tip portions in the conventional concentrated-winding permanent-magnet synchronous motor proposed as an improvement, as explained above, is constructed so as to be narrow, magnetic flux leakage between the teeth is increased, increasing inductance in the stator coil. The increase in inductance in the stator coil gives rise to an increase in a time constant of the stator coil, increasing a phase difference between a drive voltage applied to the stator coil and a driving current that actually flows through the stator coil. As a result, there have been problems of deterioration in the heavy load characteristics wherein surplus voltage during heavy loads is reduced, lowering the rotational frequency.

SUMMARY OF THE INVENTION

The present invention aims to solve the above problems and an object of the present invention is to provide a permanent-magnet synchronous motor eliminating a deterioration in heavy load characteristics resulting from a slot opening being made narrow in a permanent-magnet synchronous motor previously proposed as an improvement by prescribing a relationship between the slot opening and a slot pitch, or a relationship between the slot opening and a thickness of first and second circumferential end portions on inner circumferential ends of teeth to solve problems of a concentrated winding method wherein inductance is increased by adjacent teeth forming opposite poles.

According to one aspect of the present invention, there is provided a permanent-magnet synchronous motor including a stator and a rotor. The stator is composed of a cylindrical stator core in which 3n teeth are disposed at a predetermined pitch in a circumferential direction where n is a positive integer, slots being formed between adjacent pairs of the teeth so as to open onto an inner circumferential side; and stator coil installed as a concentrated winding in the stator core. The rotor is rotatably disposed inside the stator, 2n permanent magnets being disposed at a predetermined pitch in a circumferential direction on an outer peripheral portion of the rotor. The permanent-magnet synchronous motor is characterized in that the stator core is constructed such that a slot opening (d) and a slot pitch (p) at an inner circumferential surface of the stator core satisfy an expression $0.1 \leq d/p \leq 0.3$.

Therefore, inductance is reduced, thereby providing a compact concentrated-winding permanent-magnet synchronous motor enabling rotational frequency during heavy loads to be improved, and also enabling motor output to be improved.

According to another aspect of the present invention, there is provided a permanent-magnet synchronous motor including a stator and a rotor. The stator is composed of a cylindrical stator core in which 3n teeth are disposed at a predetermined pitch in a circumferential direction where n is a positive integer, slots being formed between adjacent pairs of the teeth so as to open onto an inner circumferential side; and stator coil installed as a concentrated winding in the stator core. The rotor is rotatably disposed inside the stator, 2n permanent magnets being disposed at a predetermined pitch in a circumferential direction on an outer peripheral portion of the rotor. The permanent-magnet synchronous motor is characterized in that the stator core is constructed such that a slot opening (d) and a thickness (h) of first and second circumferential end portions on an inner circumferential end of the teeth satisfy an expression $0.2 \leq h/d \leq 0.7$.

Therefore, inductance is reduced, thereby providing a compact concentrated-winding permanent-magnet synchronous motor enabling rotational frequency during heavy loads to be improved, and also enabling motor output to be improved.

According to yet another aspect of the present invention, there is provided a permanent-magnet synchronous motor including a stator and a rotor. The stator is composed of a cylindrical stator core in which 3n teeth are disposed at a predetermined pitch in a circumferential direction where n is a positive integer, slots being formed between adjacent pairs of the teeth so as to open onto an inner circumferential side; and stator coil installed as a concentrated winding in the stator core. The rotor is rotatably disposed inside the stator, 2n permanent magnets being disposed at a predetermined pitch in a circumferential direction on an outer peripheral portion of the rotor. The permanent-magnet synchronous motor is characterized in that the stator core is constructed such that a slot opening (d), a slot pitch (p) at an inner circumferential surface of the stator core, and a thickness (h) of first and second circumferential end portions on an inner circumferential end of the teeth satisfy an expression $0.1 \leq d/p \leq 0.3$ and an expression $0.2 \leq h/d \leq 0.7$.

Therefore, inductance is reduced, thereby providing a compact concentrated-winding permanent-magnet synchronous motor enabling rotational frequency during heavy loads to be improved, and also enabling motor output to be improved.

DETAILED DESCRIPTION OF THE PREFERRED EMBODIMENTS

Preferred embodiments of the present invention will now be explained with reference to the drawings.

Embodiment 1

Figure 1:
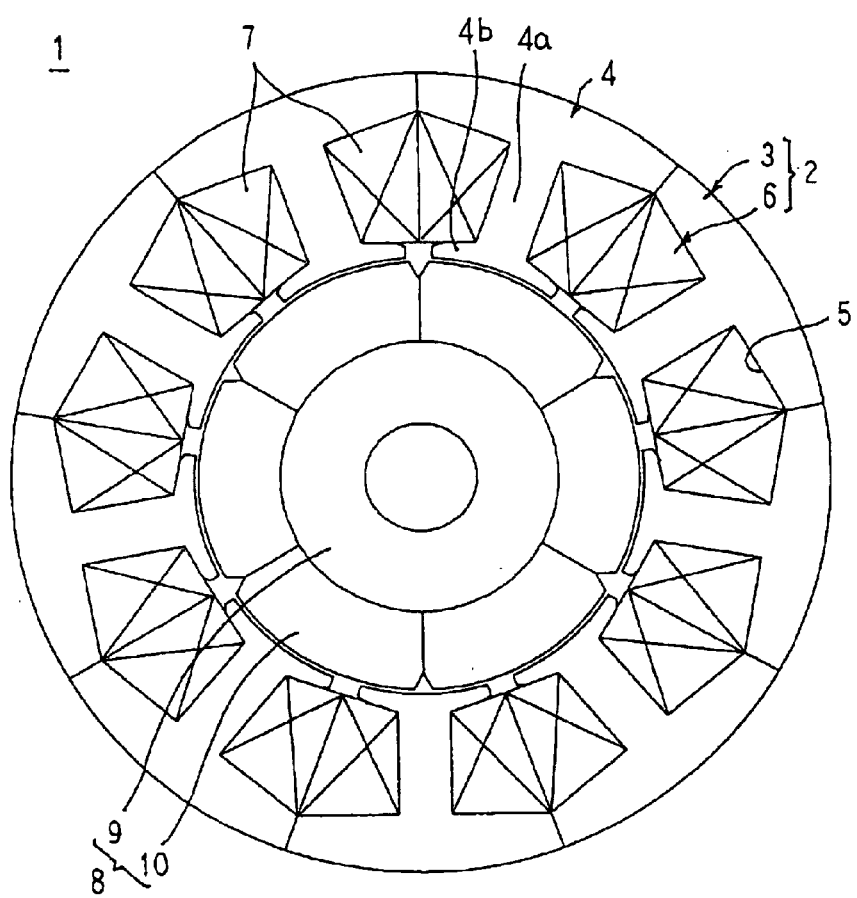
FIG. 1 is a cross section showing a permanent-magnet synchronous motor according to Embodiment 1 of the present invention.
Figure 2:
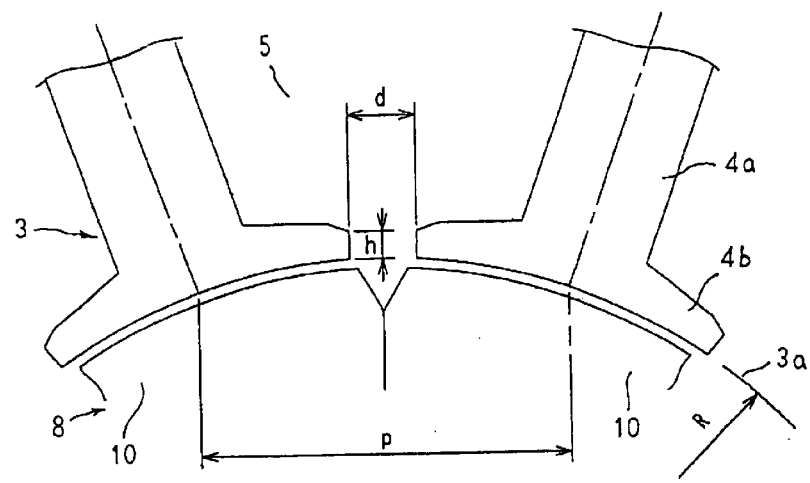
FIG. 2 is an enlarged cross section showing part of the permanent-magnet synchronous motor according to Embodiment 1 of the present invention.

FIG. 1 is a cross section showing a permanent-magnet synchronous motor according to Embodiment 1 of the present invention, and FIG. 2 is an enlarged cross section showing part of the permanent-magnet synchronous motor according to Embodiment 1 of the present invention.

In the figures, a concentrated-winding permanent-magnet synchronous motor 1 is constituted by: a stator 2; and a rotor 8 rotatably disposed inside the stator 2.

The stator 2 is constituted by: a cylindrical stator core 3 having core portions 4 corresponding in number to a number of slots 5; and a stator coil 6 installed in the stator core 3.

Each of the core portions 4 is constructed by laminating and integrating a predetermined number of sheets of a magnetic material such as a silicon steel sheet, for example. Teeth 4a formed on the core portions 4 are arranged at a uniform angular pitch in a circumferential direction, the slots 5 of the stator core 3 being formed between adjacent pairs of the teeth 4a so as to open onto an inner circumferential side. Flange portions 4b are disposed so as to extend in first and second circumferential directions from an inner circumferential end of each of the teeth 4a.

The stator coil 6 is constructed by Y-connecting three phases of coil 7 each formed by winding a coil wire independently onto the teeth 4a of each of the core portions 4 on which insulators (not shown) are disposed. In other words, the stator coil 6 is installed in the stator core 3 as a concentrated winding.

The rotor 8 is constituted by: a shaft 9 functioning as a rotor core made of a magnetic material such as iron, for example; and permanent magnets 10 fixed to outer peripheral portions of the shaft 9. Although not shown, strength against centrifugal forces is ensured by fitting a stainless thin-sheet cylinder onto an outer periphery of the rotor 8, or winding a reinforcing tape onto the outer periphery of the rotor 8. Furthermore, rare-earth magnets or ferrite magnets are used for the permanent magnets 10.

In Embodiment 1, the number of pole pairs n is 3, nine (3n) teeth 4a being arranged at a uniform angular pitch in a circumferential direction, and six (2n) permanent magnets 10 being arranged at a uniform angular pitch in a circumferential direction on an outer peripheral wall surface of the shaft 9. In other words, this concentrated-winding permanent-magnet synchronous motor 1 is a 3-slot-per-2-pole motor, in which the ratio between the number of slots in the stator 2 and the number of poles in the rotor 8 is 3:2. The concentrated-winding permanent-magnet synchronous motor 1 is constructed so as to function as a motor in which the rotor 8 rotates by passing through the stator coil 6 a driving current that is adjusted according to the rotational position of the rotor 8.

As shown in FIG. 2, dimensions of the concentrated-winding permanent-magnet synchronous motor 1 are set such that $0.1 \leq d/p \leq 0.3$, where d is a slot opening of the stator core 3 and p is a slot pitch at an inner circumferential surface $3a$ of the stator core 3. Moreover, the slot pitch p is expressed by $p=2\pi R/S$, where 2R is an inside diameter of the stator core 3 and S is the number of slots 5. The slot opening d is a gap between the flange portions 4b (a gap between edges of the inner circumferential ends of an adjacent pair of teeth 4a). Furthermore, a thickness h of end portions of the flange portions 4b (first and second circumferential edge portions on the inner circumferential ends of the teeth 4a) is 1.0 mm.

Figure 3:
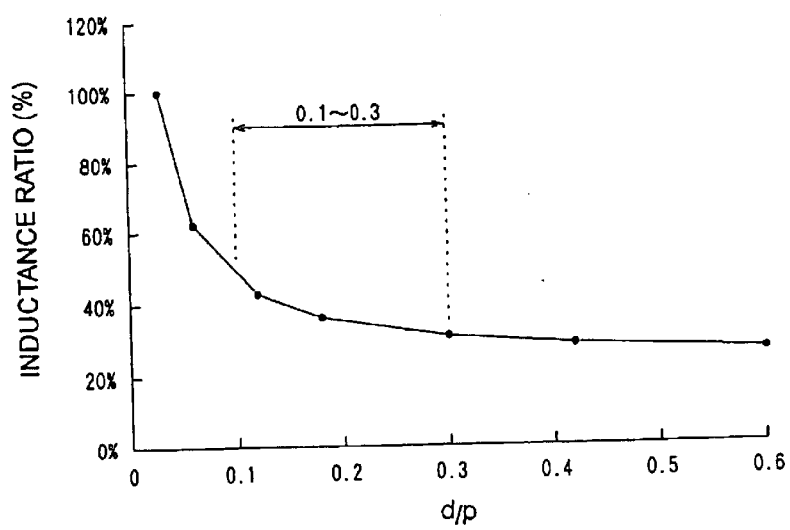
FIG. 3 is a graph showing a relationship between a ratio of slot opening d to slot pitch p and an inductance ratio in the permanent-magnet synchronous motor according to Embodiment 1 of the present invention.
Figure 4:
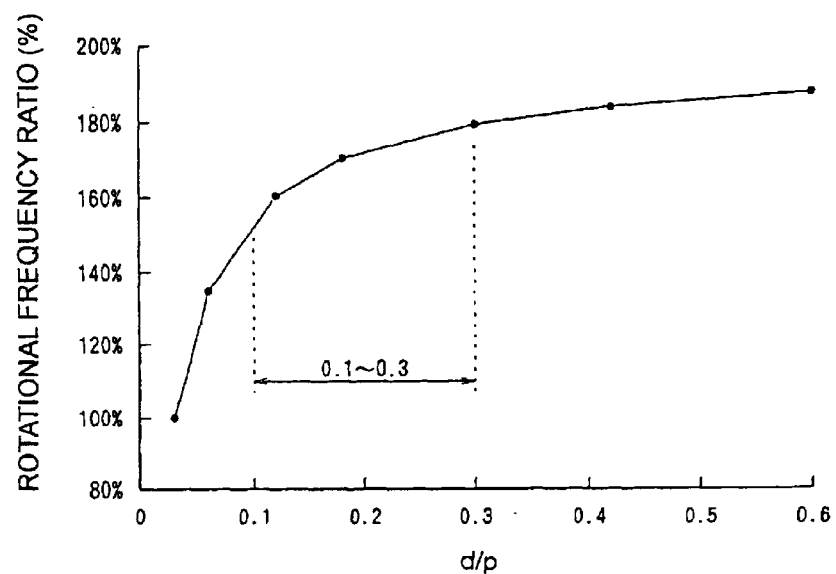
FIG. 4 is a graph showing a relationship between the ratio of slot opening d to slot pitch p and a rotational frequency ratio in the permanent-magnet synchronous motor according to Embodiment 1 of the present invention.
Figure 5:
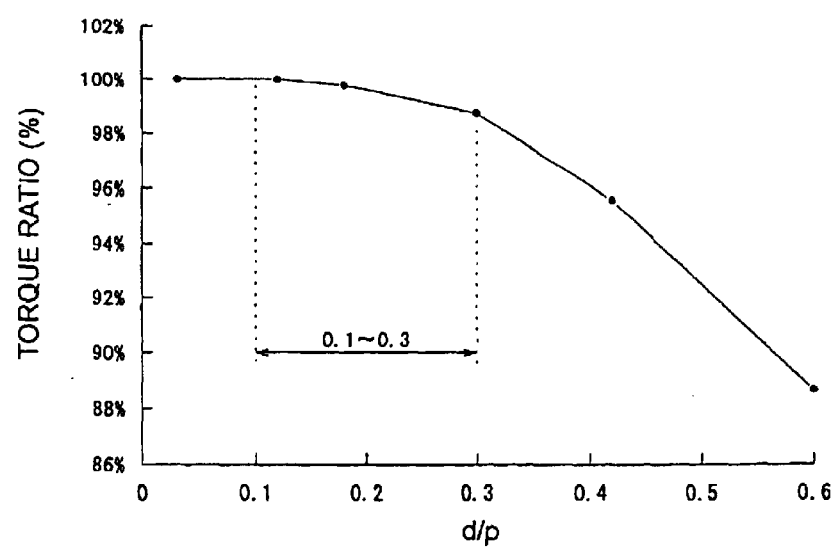
FIG. 5 is a graph showing a relationship between the ratio of slot opening d to slot pitch p and a torque ratio in the permanent-magnet synchronous motor according to Embodiment 1 of the present invention.

Now, results are shown in FIGS. 3, 4, and 5 in which an inductance ratio (percent), a rotational frequency ratio (percent), and a torque ratio (percent) were measured in the concentrated-winding permanent-magnet synchronous motor 1 constructed in this manner while d was varied with p fixed at 16.5 mm.

From FIG. 3, it can be seen that when d/p is less than 0.1 (d/p<0.1), the inductance ratio drops rapidly as d/p increases, and when d/p exceeds 0.1, the drop in the inductance ratio is small. When d/p is equal to or greater than 0.1 ($0.1 \leq d/p$), the inductance ratio is kept to a low level.

From FIG. 4, it can be seen that when d/p is less than 0.1 (d/p<0.1), the rotational frequency ratio increases rapidly as d/p increases, and when d/p exceeds 0.1, the increase in the rotational frequency ratio is small. When d/p is equal to or greater than 0.1 ($0.1 \leq dip$), the rotational frequency ratio is kept to a high level.

Thus, because changes in the characteristics of the motor due to irregularities in the inductance ratio and the rotational frequency ratio become large when d/p is set in the region in which the changes in the inductance ratio and the rotational frequency ratio are large (d/p<0.1), making the performance of the product unstable, it is desirable for d/p to be equal to or greater than 0.1 (0.1≦d/p).

From FIG. 5, it can be seen that when d/p is equal to or less than 0.3 (d/p≦0.3), the torque ratio decreases gradually as d/p increases, and when d/p exceeds 0.3, the torque ratio decreases rapidly. When d/p is equal to or less than 0.3 (d/p≦0.3), the torque ratio is kept to a high level.

Thus, because changes in the characteristics of the motor due to irregularities in the torque ratio become large when d/p is set in the region in which the changes in the torque ratio are large (0.3<d/p), making the performance of the product unstable, it is desirable for d/p to be equal to or less than 0.3 (d/p≦0.3).

Thus, if the relationship between the slot opening d and the slot pitch p in the stator core 3 is set so as to satisfy the expression 0.1≦d/p≦0.3, problems with the concentrated winding method such as inductance being increased by adjacent teeth forming opposite poles are solved, and deterioration in heavy load characteristics resulting from making the slot openings narrow is eliminated, thereby providing a motor in which torque reduction is small, inductance is reduced, and rotational frequency is high. Because the torque reduction is small compared to the improvement in rotational frequency, output from the motor can be improved. In addition, the size of a motor can be reduced without reducing output, enabling it to be made more compact.

Moreover, similar effects to those in Embodiment 1 above were also achieved when the slot pitch p was changed (≠16.5 mm) and the relationship between d/p and the inductance ratio, the relationship between d/p and the rotational frequency ratio, and the relationship between d/p and the torque ratio were measured.

Embodiment 2

In Embodiment 2, dimensions of the concentrated-winding permanent-magnet synchronous motor 1 according to Embodiment 1 above are set such that 0.2≦h/d≦0.7, where d is a slot opening of the stator core 3 and h is a thickness of an end portion of the flange portions 4b.

Figure 6:
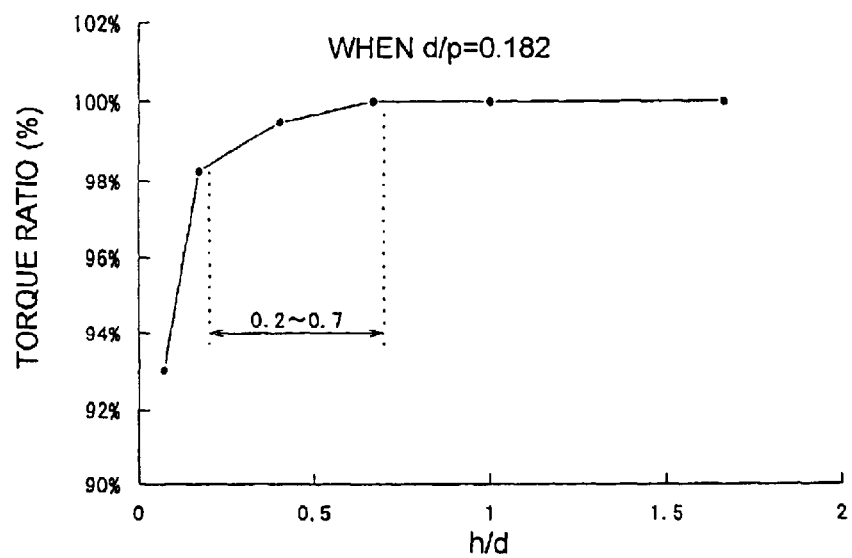
FIG. 6 is a graph showing a relationship between a ratio of tooth end portion thickness h to slot opening d and a torque ratio in the permanent-magnet synchronous motor according to Embodiment 2 of the present invention.
Figure 7:
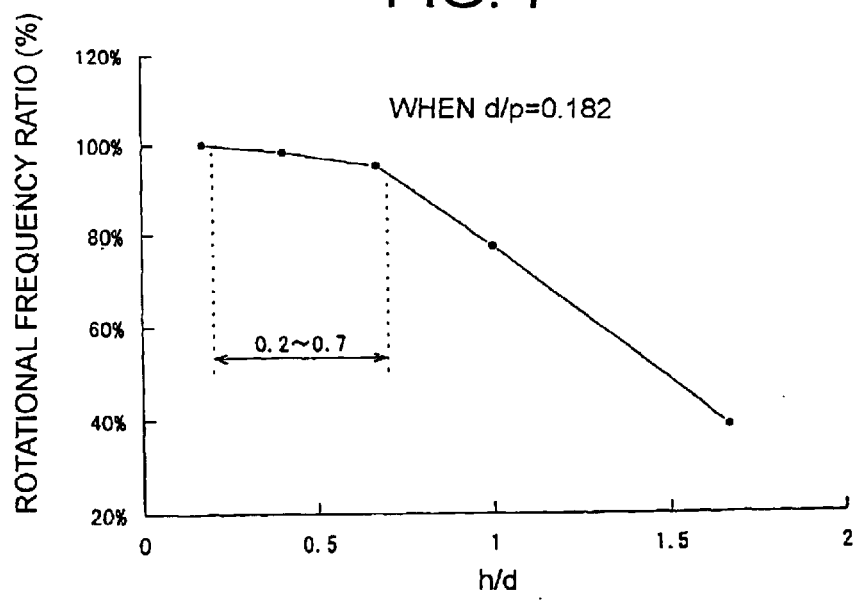
FIG. 7 is a graph showing a relationship between the ratio of tooth end portion thickness h to slot opening d and a rotational frequency ratio in the permanent-magnet synchronous motor according to Embodiment 2 of the present invention.
Figure 8:
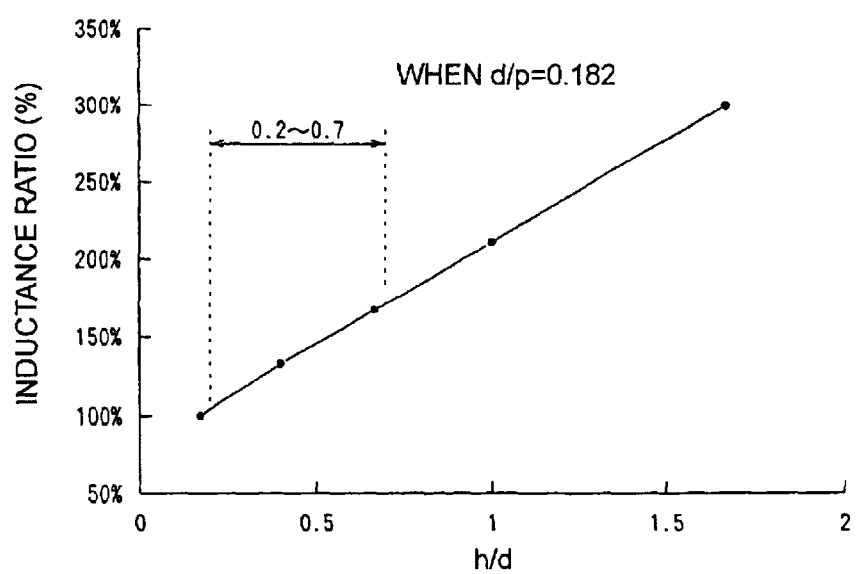
FIG. 8 is a graph showing a relationship between the ratio of tooth end portion thickness h to slot opening d and an inductance ratio in the permanent-magnet synchronous motor according to Embodiment 2 of the present invention.

Now, results are shown in FIGS. 6, 7, and 8 in which the torque ratio (percent), the rotational frequency ratio (percent), and the inductance ratio (percent) were measured in a stator core 3 in which the slot pitch p at the inner circumferential surfaces 3a of the stator core 3 was 16.5 mm and the slot opening d was 3.0 mm (d/p=0.182), while h was varied.

From FIG. 6, it can be seen that when h/d is less than 0.2 (h/d<0.2), the torque ratio increases rapidly as h/d increases, and when h/d exceeds 0.2, the increase in the torque ratio is small. When h/d is equal to or greater than 0.2 (0.2≦h/d), the torque ratio is kept to a high level.

Thus, because changes in the characteristics of the motor due to irregularities in the torque ratio become large when h/d is set in the region in which the changes in the torque ratio are large (h/d<0.2), making the performance of the product unstable, it is desirable for h/d to be equal to or greater than 0.2 (0.2≦h/d).

From FIG. 7, it can be seen that when h/d is equal to or less than 0.7 (h/d≦0.7), the rotational frequency ratio decreases gradually as h/d increases, and when h/d exceeds 0.7, the rotational frequency ratio decreases rapidly. When h/d is equal to or less than 0.7 (h/d≦0.7), the rotational frequency ratio is kept to a high level.

Thus, because changes in the characteristics of the motor due to irregularities in the rotational frequency ratio become large when h/d is set in the region in which the changes in the rotational frequency ratio are large (0.7<h/d), making the performance of the product unstable, it is desirable for h/d to be equal to or less than 0.7 (h/d≦0.7).

From FIG. 8, it can be seen that the inductance ratio increases as h/d increases. If the inductance ratio is large, the time constant of the coil is increased, increasing a phase difference between a drive voltage applied to the coil and a driving current that actually flows through the coil. As a result, surplus voltage during heavy loads is reduced, lowering the rotational frequency. Furthermore, if the inductance ratio is too small, in other words, if h is reduced by too much, the teeth become magnetically saturated, giving rise to torque reduction.

Thus, if the relationship between the thickness h of the end portion of the flange portions 4b of the teeth 4a and the slot opening d in the stator core 3 is set so as to satisfy the expression 0.2≦h/d≦0.7, problems with the concentrated winding method such as inductance being increased by adjacent teeth forming opposite poles are solved, and deterioration in heavy load characteristics resulting from making the slot openings narrow is eliminated, thereby providing a motor in which torque reduction is small, inductance is reduced, and rotational frequency is high. Because the torque reduction is small compared to the improvement in rotational frequency, output from the motor can be improved. In addition, the size of a motor can be reduced without reducing output, enabling it to be made more compact.

Moreover, similar effects to those in Embodiment 2 above were also achieved when the slot opening d was changed (≠3.0 mm) and the relationship between h/d and the torque ratio, the relationship between h/d and the rotational frequency ratio, and the relationship between h/d and the inductance ratio were measured.

Embodiment 3

In Embodiment 3, the concentrated-winding permanent-magnet synchronous motor 1 according to Embodiment 1 above is constructed such that the relationship between the slot opening (d) and the slot pitch (p) and the relationship between the slot opening (d) and the thickness (h) of the end portion of the flange portions 4b in the stator core 3 satisfy the expression 0.1≦d/p≦0.3 and the expression 0.2≦h/d≦0.7, respectively.

Consequently, according to Embodiment 3, a synergistic combination of the effects of Embodiments 1 and 2 above can be achieved.

Moreover, each of the above embodiments has been explained with reference to a concentrated-winding permanent-magnet synchronous motor in which the number of magnetic poles in the rotor 8 is six and the number of slots is nine, but it is only necessary for the present invention to be applied to a 3-slot-per-2-pole concentrated-winding permanent-magnet synchronous motor, and for example, similar effects can also be achieved if the present invention is applied to a concentrated-winding permanent-magnet synchronous motor in which the number of magnetic poles in the rotor 8 is eight and the number of slots is twelve.

In each of the above embodiments, the construction of the stator core 3 is explained as having a plurality of core portions 4, but the stator core 3 is not limited to this construction, and for example, a stator core prepared by punching annular bodies having teeth and slots out of a thin sheet of magnetic material and laminating and integrating the annular bodies, or a stator core prepared by punching a strip-shaped body having teeth and slots out of a strip-shaped thin sheet of magnetic material and winding the strip-shaped body into a helical shape and integrating it, can be used.

In each of the above embodiments, the rotor 8 is constituted by a shaft 9 made of a magnetic material and permanent magnets 10 fixed to outer peripheral portions of the shaft 9, but the rotor is not limited to this construction and a rotor may also be used in which permanent magnets are fixed to an outer periphery of a cylindrical rotor core composed of a magnetic material, a shaft being passed through and fixed to a central axial portion of the rotor core. In that case, it is not necessary for the shaft to be made of a magnetic material.

Uses of the concentrated-winding permanent-magnet synchronous motor according the present invention will now be explained.

First, the concentrated-winding permanent-magnet synchronous motor according the present invention can be applied to a rectangular-wave-driven motor driven by applying a rectangular-wave driving voltage to a stator coil.

Generally, a phase difference α arising between the driving voltage applied to the stator coil and the driving current which actually flows through the stator coil is given by the following expression:

$$\alpha = \tan^{-1}\{(\omega LI)/(e+RI)\},$$

where ω is the frequency of the driving current (=2πf), L is the inductance, I is the driving current, e is the motor induced voltage, and R is the coil resistance.

From the above expression, the phase difference α increases as the frequency rises.

A rectangular wave can be considered to be a combination of sine waves including higher-order frequency components. Thus, when the present invention is applied to a rectangular-wave-driven motor in which the driving current includes a large portion of high-order components having a high frequency, deterioration in heavy-load characteristics resulting from the phase difference α being large can be suppressed because the phase difference α can be reduced due to the inductance-reducing effects of the concentrated-winding permanent-magnet synchronous motor according to the present invention. In other words, if the concentrated-winding permanent-magnet synchronous motor according to the present invention is applied to a rectangular-wave-driven motor, the inductance-reducing effects of the present invention are exhibited even more clearly.

Next, considering the motor characteristics of concentrated-winding permanent-magnet synchronous motors, generally, if the slot openings are small, cogging torque in the motor is reduced, increasing the torque generated by the motor (the torque constant of the motor). However, if the slot openings are made smaller, magnetic flux leakage between adjacent teeth is increased, increasing inductance in the coils. Then, if the inductance in the coils is increased, the time constant of the coil increases, increasing the phase difference between the driving voltage applied to the coils and the driving current that actually flows through the coils. As a result, surplus voltage during heavy loads is reduced, lowering the rotational frequency.

Thus, since the motor characteristics during heavy loads deteriorate if the slot openings are reduced too much, making the slot openings larger by a certain amount is effective for applications where cogging torque is not a problem.

Thus, these effects are exhibited clearly if the concentrated-winding permanent-magnet synchronous motor according the present invention is applied to applications where cogging torque is not a problem.

The concentrated-winding permanent-magnet synchronous motor according the present invention can be applied, for example, to hydraulic pump driving motors, in which cogging torque is not considered to be a problem. Examples of hydraulic pumps of this kind include hydraulic pumps for power-steeling apparatuses in automotive vehicles, for example. In such cases, the concentrated-winding permanent-magnet synchronous motor according the present invention is suitable for automotive use because of its reduced size.

The concentrated-winding permanent-magnet synchronous motor according the present invention can also be applied to electric power-steering apparatus motors. Again, the concentrated-winding permanent-magnet synchronous motor according the present invention is suitable for automotive use because of its reduced size. In such cases, the concentrated-winding permanent-magnet synchronous motor according to the present invention is applied by performing a process such as damping, etc., to alleviate the influence of cogging torque.

What is claimed is:

1. A permanent-magnet synchronous motor comprising:
    a stator, comprising:
        a cylindrical stator core in which 3n teeth are disposed at a predetermined pitch a circumferential direction where n is a positive integer, slots being formed between adjacent pairs of said teeth so as to open onto an inner circumferential side; and
        a stator coil installed as a concentrated winding in said stator core; and
    a rotor rotatably disposed inside said stator, 2n permanent magnets being disposed at a predetermined pitch in a circumferential direction on an outer peripheral portion of said rotor,
    wherein said stator core is constructed such that a slot opening (d) and a thickness (h) of first and second circumferential end portions on an inner circumferential end of said teeth satisfy an expression $0.2 \leq h/d \leq 0.7$.

2. The permanent-magnet synchronous motor according to claim 1, wherein:
    said motor is constructed so as to be driven by applying a rectangular-wave driving voltage to said stator coil.

3. A permanent-magnet synchronous motor comprising:
    a stator, comprising:
        a cylindrical stator core in which 3n teeth are disposed at a predetermined pitch in a circumferential direction where n is a positive integer, slots being formed between adjacent pairs of said teeth so as to open onto an inner circumferential side; and
        a stator coil installed as a concentrated winding in said stator core, and
    a rotor rotatably disposed inside said stator, 2n permanent magnets being disposed at a predetermined pitch in a circumferential direction on an outer peripheral portion of said rotor,
    wherein said stator core is constructed such that a slot opening (d), a slot pitch (p) at an inner circumferential surface of said stator core, and a thickness (h) of first and second circumferential end portions on an inner circumferential end of said teeth satisfy an expression $0.1 \leq d/p \leq 0.3$ and an expression $0.2 \leq h/d \leq 0.7$.

4. The permanent-magnet synchronous motor according to claim 3, wherein:
    said motor is constructed so as to be driven by applying a rectangular-wave driving voltage to said stator coil.

* * * * *